United States Patent [19]

Sweet et al.

[11] 4,009,906

[45] Mar. 1, 1977

[54] METERING GATE FOR METERING A FLUID MATERIAL AS IT IS DISCHARGED FROM A HOPPER

[75] Inventors: Philip J. Sweet; Buck C. Hamlet; David L. Sweet, all of Fresno, Calif.

[73] Assignee: American Carrier Equipment, Inc., Fresno, Calif.

[22] Filed: Sept. 15, 1975

[21] Appl. No.: 613,055

[52] U.S. Cl. .................................. 298/27; 105/240; 105/282 P; 222/503; 222/504

[51] Int. Cl.² .......................................... B60P 1/56

[58] Field of Search .......... 222/502, 503, 504, 561; 298/28, 27, 35 M; 105/240, 282 P, 282 R

[56] References Cited

UNITED STATES PATENTS

| | | | |
|---|---|---|---|
| 3,029,714 | 4/1962 | Creswell | 222/503 X |
| 3,145,057 | 8/1964 | Taggart | 222/503 X |
| 3,173,381 | 3/1965 | Charles et al. | 298/35 M X |

*Primary Examiner*—Robert B. Reeves
*Assistant Examiner*—John P. Shannon
*Attorney, Agent, or Firm*—Huebner & Worrel

[57] ABSTRACT

An improved metering gate for metering fluid materials discharged from a hopper of the type including a vertically oriented discharge opening. The metering gate is characterized by a pair of closure panels arranged in coplanar relation, a drive mechanism including a plurality of rams connected with said closure panels for displacing the closure panels in opposite directions along a pair of aligned linear paths traversing the opening, and a motion balancing mechanism interconnecting the panels for equalizing the distances through which the panels are displaced by said drive mechanism, and a lag-elimination mechanism for eliminating lag in the displacement imparted to the opposite ends of each panel of said pair, whereby each portion of each panel of said pair of closure panels is displaced through a distance equal to the distance through which any other portion of either panel of said pair of closure panels is displaced by said drive mechanism.

4 Claims, 4 Drawing Figures

METERING GATE FOR METERING A FLUID MATERIAL AS IT IS DISCHARGED FROM A HOPPER

BACKGROUND OF THE INVENTION

1. Field of the Invention

The invention generally relates to an improved metering gate for a hopper and more particularly to an improved metering gate for metering fluid material, such as bulk grain and the like, as it is discharged from the hopper.

2. Description of the Prior Art

The prior art is, of course, replete with bins, hoppers, and the like to confine fluid materials typified by bulk grain. Such hoppers often are mounted on vehicles, such as trailers, and utilized in transporting bulk grain. Such hoppers frequently are provided with metering gates for metering fluid material as it is discharged from openings formed in the bottoms of the hoppers.

As can readily be appreciated by those familiar with the design, fabrication, and operation of grain trailers of the type having hoppers provided with discharge openings in the bottom portions thereof, it has been found to be particularly difficult to achieve precise metering of contents discharged from the hoppers, due to the inability to achieve precise control over the operational displacement of the closure panels for metering gates employed in covering the discharge openings.

For example, it is not uncommon to utilize a plurality of rams for imparting displacement to closure panels. These rams are interconnected with closure panels which are supported for displacement, in opposite directions, for controlling the discharge of contents from the hoppers. Unfortunately, where the rams are interconnected in a common hydraulic circuit it has been found that the rams which encounter least opposition to motion initially experience the greatest degree of displacement. Consequently, uniformity in the displacement of the closure panels has been difficult to achieve. As a consequence, inaccuracy in the metering of the flow of contents, such as bulk grain, from the discharge openings of hoppers has been the rule rather than the exception.

It is, therefore, the general purpose of the instant invention to provide an improved metering gate for metering fluid materials, with greater accuracy, as the materials are discharged from hoppers particularly adapted to be mounted on grain trailers and the like.

OBJECTS AND SUMMARY OF THE INVENTION

It is, therefore, an object of the instant invention to provide an improved metering gate which overcomes the aforementioned disadvantages and difficulties.

It is another object to provide an improved metering gate for a discharge opening of a hopper adapted to be mounted on a vehicle.

It is another object to provide an improved metering gate for metering fluid material as it is discharged from a discharge opening located in the bottom portion of a hopper for a grain trailer.

It is another object to provide an improved metering gate having a pair of coplanar panels supported for simultaneous displacement in opposite directions, and means for assuring that each portion of the closure panels of the pair of closure panels is displaced through a distance equal to the distance through which any other portion of a closure panel of said pair is displaced by said drive means.

It is another object to provide an improved metering gate which is particularly suited for use in connection with the metering of the flow of grain discharged from grain trailers, although not necessarily restricted in use thereto, since the improved metering gate may be similarly useful when installed and employed for metering fluid materials from stationary hoppers and from hoppers such as those utilized in dispensing bulk materials of a general nature including, but not limited to, sand, gravel, and the like.

These and other objects and advantages are achieved through a use of motion balancing means interconnecting slidable closure panels covering the discharge openings of hoppers for equalizing the distances through which the closure panels are oppositely and simultaneously displaced, and lag-elimination means comprising a gear train interconnecting the opposite ends of each panel for equalizing the displacement imparted thereto, as will hereinafter become more readily apparent by reference to the following description and claims in light of the accompanying drawings.

DESCRIPTION OF THE PREFERRED EMBODIMENT

Figure 1:
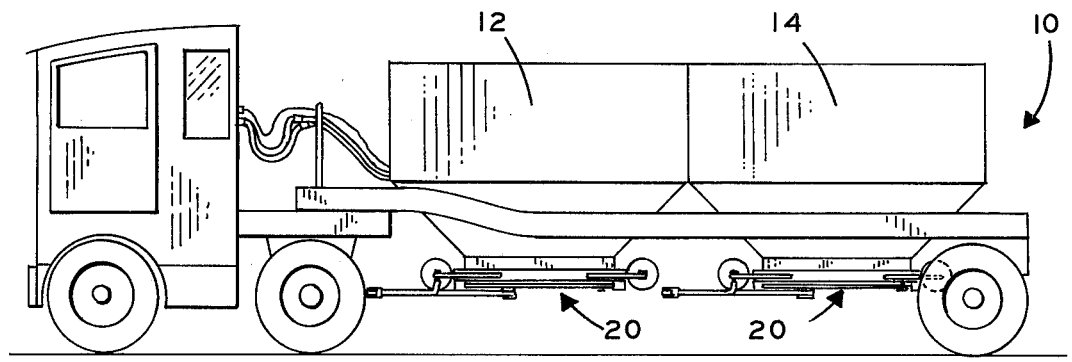
FIG. 1 is an elevational view of a semitrailer equipped with a pair of aligned hoppers, each of which includes a vertically oriented discharge opening located in the bottom thereof equipped with an improved metering gate embodying the principles of the instant invention.

Referring now to the drawings wherein like reference characters designate like or corresponding parts throughout the several views, there is shown in FIG. 1 a vehicle including a semitrailer 10 having mounted thereon a pair of aligned hoppers 12 and 14 adapted for use in transporting grain and the like. It will be appreciated that the utility of the trailer 10 is well understood by those familiar with the trucking industry.

Figure 3:
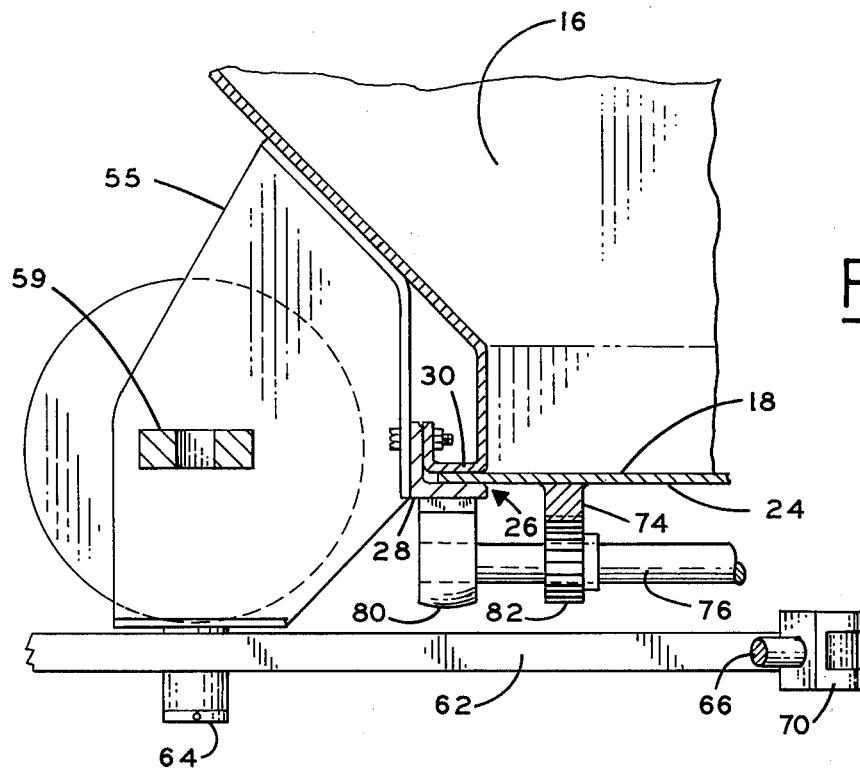
FIG. 3 is a fragmented view taken generally along line 3—3 of FIG. 2.

Since the hoppers 12 and 14 form no specific part of the instant invention, and the details thereof can be varied as desired, a detailed description of the hoppers is omitted in the interest of brevity. However, it is to be understood that each of the hoppers 12 and 14 is equipped with a vertically oriented throat 16, FIG. 3, which terminates in a vertically oriented discharge opening 18, FIG. 3. Moreover, each of the discharge openings 18 is closed by an improved metering gate, generally designated 20, which embodies the principles of the instant invention. Since the metering gates 20 are of a common design and function in substantially the same manner to achieve substantially the same result, a detailed description of only one of the gates is deemed adequate to provide a complete understanding of the invention.

As illustrated, each of the metering gates 20 includes a pair of closure panels 22 and 24 arranged in coplanar relation and extended in covering relation with the discharge opening 18. Each of the panels 22 and 24, in turn, is supported for lateral displacement at their opposite ends by a pair of linear tracks 26. These tracks are extended in parallelism along opposite sides of the discharge opening 18, preferably transversely with respect to the longitudinal axis of the trailer 10.

While the tracks 26 are formed in any suitable manner, the tracks, as shown in the drawings, include a pair of right-angle members 28 connected with a pair of lips 30 integrally related to the hopper and circumscribing the discharge opening 18. The right-angle members 28 are bolted or otherwise rigidly secured to the lip 30 in vertically spaced relation therewith for defining therebetween an opening, not designated. This opening serves to receive the end portions of the closure panels 22 and 24, so that the closure panels are thus supported for rectilinear displacement along a pair of aligned paths extending transversely with respect to the longitudinal axis of the trailer 10. Moreover, it is to be understood that the closure panels 22 and 24 are supported for simultaneous displacement in opposite directions, whereby the discharge opening 18 is uncovered simply by separating the closure panels 22 and 24 and is covered by moving the panels in opposite directions into an abutting relationship along the center line of the discharge opening 18.

Figure 2:
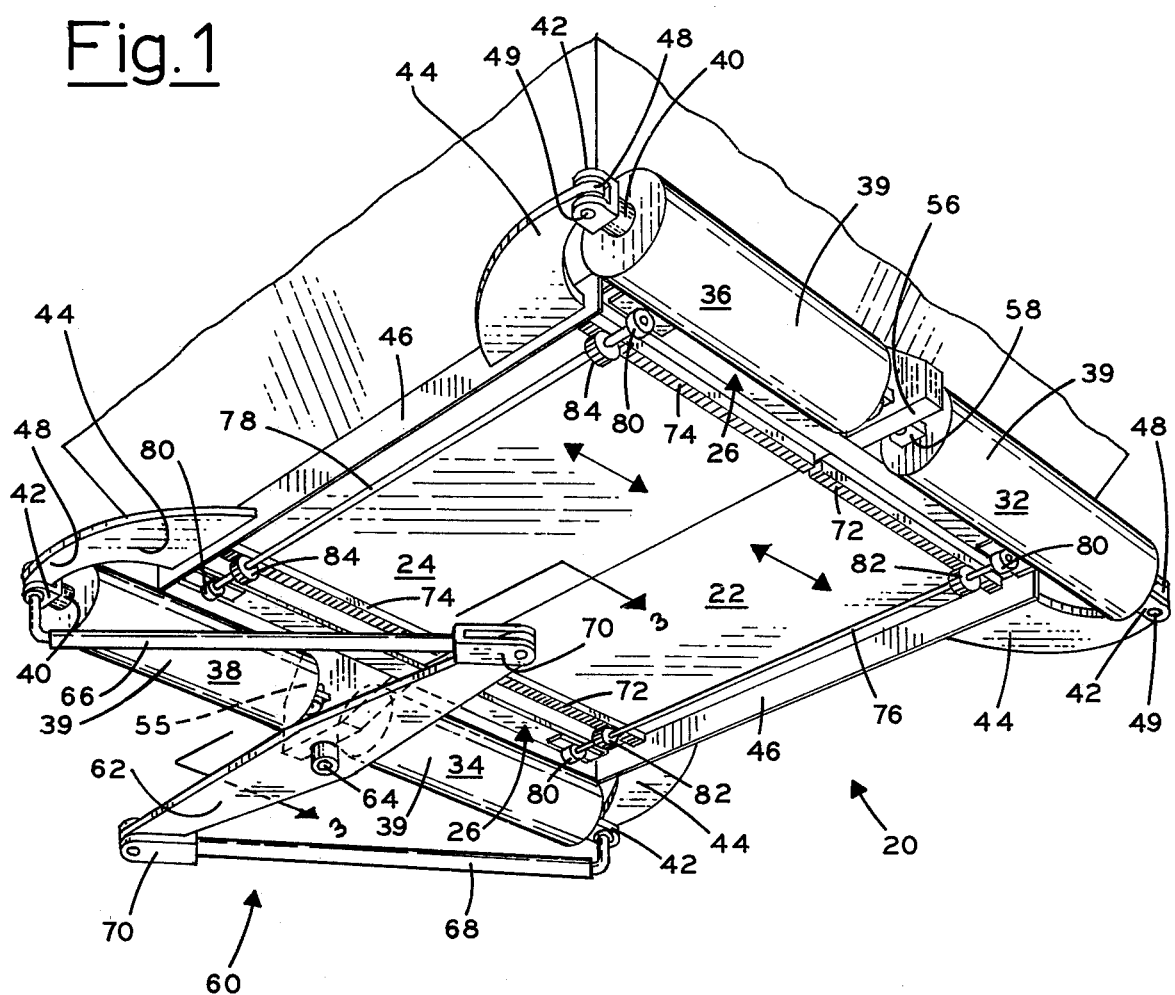
FIG. 2 is a perspective view illustrating one of the improved metering gates shown in FIG. 1.

The metering gate 20 is actuated through a selective operation of drive means connected thereto. The drive means includes two pairs of simultaneously operable double-acting rams, including a first pair of rams 32 and 34 connected with the closure panel 22, and a second pair of rams 36 and 38 connected with the closure panel 24. The rams 32 through 38 are of a commercially available, common design. Each of the rams includes a barrel 39 having an axially extensible output shaft 40, including a clevis 42 provided at the distal end thereof. Each clevis 42, in turn, serves to receive a bracket 44 rigidly affixed to one end portion of one of the closure panels 22 and 24 and extended therefrom in substantial coplanar relation therewith, as best illustrated in FIG. 2. As a practical matter, each of the brackets 44 is projected from a down-turned lip 46 provided along the outermost edges of the door panels 22 and 24. Moreover, each of the brackets 44 is tapered to include a distal end portion 48 connected with the receiving clevis 42 by a suitable pivot pin 49.

Figure 4:
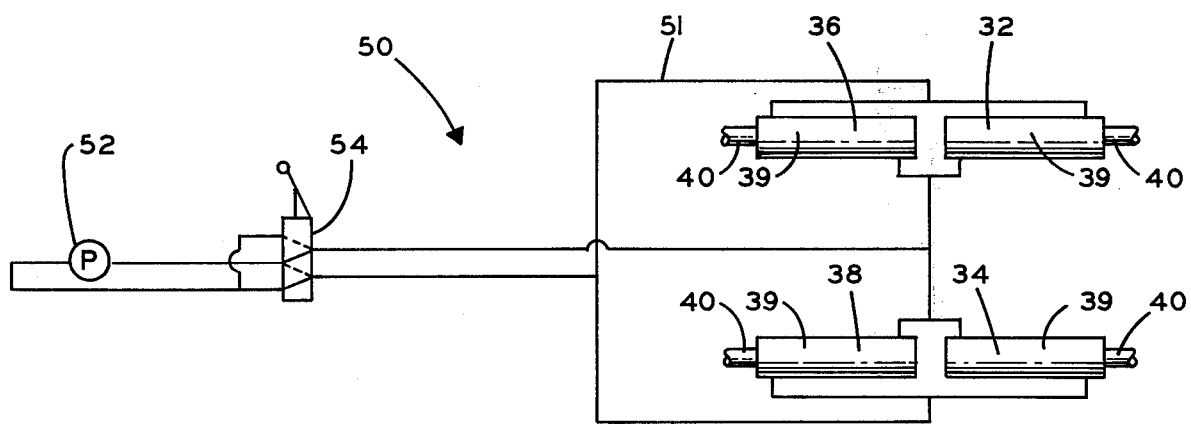
FIG. 4 is a schematic view illustrating a hydraulic circuit for controlling the metering gate.

As best illustrated in FIG. 4, the rams 32 through 38 are interconnected within a hydraulic circuit 50 through suitable conduits 51. As shown in FIG. 4, the circuit 50 includes a suitable pump 52 connected with a suitable source of hydraulic fluid, not shown. The pump also is connected to the rams 32 through 38 via a selector valve 54 of known design.

It is to be understood that the selector valve 54 is of a design which permits it to be repositioned to a first position whereupon the valve assumes a first configuration for simultaneously completing a circuit between the pump 52 and the base ends of the rams 32 through 38, whereupon the shafts 40 are extended substantially simultaneously. Extension of the rams serves to displace the closure panels 22 and 24 into an uncovering relationship with respect to the discharge opening 18. In order to again cover the discharge opening 18, the valve 54 is repositioned to a second position and assumes a second configuration for completing a circuit between the pump 52 and the opposite ends of the rams for causing the shafts 40 to be retracted substantially simultaneously. Retraction of the rams serves to reposition the closure panels 22 and 24 in a covering relationship with the discharge opening 18.

Preferably, the selector valve 54 is so designed as to be positionable in yet another position for thus assuming a third configuration wherein passage of fluid in either direction is blocked for thus locking the circuit. Once the circuit is thus locked, the shafts 40 are maintained stationary for thus supporting the closure panels against lateral displacement for thus controlling the rate at which flowable contents are discharged between the closure panels 22 and 24.

It will be appreciated that the rams 32 through 38 are supported at opposite sides of the discharge opening 18 in any suitable manner. As a practical matter, a bracket 56 is affixed to and extended outwardly from the opposite sides of the hopper to which it is affixed, in a vertical plane substantially bisecting the discharge opening 18. Each of the rams is provided with a clevis 58 coupled with an adjacent bracket 56 through a projected lip 59, FIG. 3, integrally related to the bracket 56.

It will, of course, be appreciated by those familiar with the design and operation of hydraulic circuits that even though the rams 32 through 38 are activated at substantially the same time, the shafts 40 are extended at different rates, depending upon the magnitude of the resistance to motion encountered by the shafts 40 as they are extended from the barrels 39. Since the metering gate 20 is employed in metering a flow of materials through the discharge opening 18, it is highly desirable to achieve a substantially simultaneous displacement of the shafts 40 in order to thus assure that the displacement of the closure panels 22 and 24 is equalized so that the dimension of the opening defined between the closure panels is accurately controlled.

In order to achieve such equalization, a motion balancing mechanism 60, FIG. 2, is provided. Through this mechanism the shafts 40 of the rams 34 and 38 are interconnected so that these shafts are constrained to be displaced simultaneously, although in opposite directions, for thus assuring that the panels 22 and 24 are simultaneously displaced through equal distances.

The motion restraining mechanism 60 includes a bell crank 62 pivotally connected to the bracket 55 by a pivot pin 64 extended through the bell crank and secured to the bracket in any suitable fashion. While the bell crank 62, as illustrated, is of a linear configuration, it should readily be apparent that any configuration suitable for achieving a desired operation of the motion balancing mechanism 60 can be utilized.

The opposite ends of the bell crank 62 are interconnected with the end portions 48 of the brackets 44 projected from the closure panels 22 and 24 by a pair of connecting rods 66 and 68. Each of the connecting rods 66 and 68 includes a clevis 70 pinned to the bell crank 62, while the opposite end of the connecting rod is joined to the distal end of one of the output shafts 40 of the rams 34 and 38. As a practical matter, the connecting rods may, where so desired, be integral with the pins 49 which serve as clevis pins for coupling the clevises 42 with the brackets 44. In any event, as either of these shafts 40 is displaced axially, in either direction, coextensive displacement in an opposite direction necessarily is imparted to the other output shaft as a consequence of pivotal motion being thus imparted to the bell crank 62. It should now be apparent that through the mechanism 60, early displacement of either of the closure panels 22 and 24, which would otherwise be initiated through an early extension of one of the shafts 40 of the rams 32 or 36, is precluded as the rams 34 and 38 are simultaneously pressurized for displacing the shafts, and the shafts are simultaneously advanced through pivotal motion imparted to the bell crank 62.

Since the rams 32 through 38 are connected with the closure panels 22 and 24 at their opposite ends, there exists a tendency for one end of the closure panels to lag behind the other as the panels are displaced. In order to equalize the displacement imparted to the opposite ends of each of the closure panels 22 and 24, there is provided a lag-elimination gear train, not designated, through which motion imparted to one end of the closure panels is transmitted to the opposite end of the closure panel. The lag-elimination gear train includes a pair of racks 72 and 74 mounted in spaced parallelism along the opposite end portions of the panels 22 and 24. Extended between the opposite end portions of the closure panels 22 and 24 there is a pair of drive shafts 76 and 78, respectively. The drive shafts 76 and 78 are supported by suitable journals 80 rigidly affixed to the right-angle members 28, FIG. 3. Upon the drive shaft 76 there is provided a pair of pinion gears 82 which are rigidly fixed to the drive shaft, while a pair of pinion gears 84 are rigidly affixed to the drive shaft 78. Consequently, it should be apparent that in the event either end of the closure panel 22 is caused to advance, the drive shaft 76 is caused to rotate for driving the pinion gear 82 located at the opposite end of the shaft for thus imparting displacement to the opposite end of the closure panel. Similarly, in the event either end of the closure panel 24 is caused to move the shaft 78 serves to drive the opposite end of the closure panel 24 in simultaneous displacement.

OPERATION

It is believed that in view of the foregoing description, the operation of the device will readily be understood and it will be briefly reviewed at this point.

With the metering gate 20 assembled in the manner hereinbefore described and connected beneath a hopper, adjacent the discharge opening 18 provided in the bottom of the hopper, the metering gate is readied for controlling a gravitating discharge of flowable contents from the hopper.

Initially, the closure panels 22 and 24 are seated in a coplanar abutting relationship for thus covering the discharge opening 18. However, since the closure panels 22 and 24 are supported for lateral displacement along coaxially aligned rectilinear paths, the discharge opening 18 is uncovered simply by repositioning the selector valve 54 to a given position at which the valve assumes a configuration such that the base ends of the rams 32 through 38 are simultaneously pressurized by fluid delivered thereto from the pump 52 via the conduit 51.

Of course, the resistance to motion encountered by the output shafts 40 of the rams 32 through 38 is unequal for the apparent reason that resistance offered to the door panels 22 and 24 is unequal. However, displacement of the closure panels 22 and 24 is simultaneous, even though in opposite directions, due to a pivotal displacement of the bell crank 62 of the motion balancing mechanism 60. This result is achieved regardless of which end of which closure panel starts to advance, since displacement of both ends of the closure panels is simultaneously achieved through the operation of the lag-elimination drive trains which include the drive shafts 76 and 78 and the pinion gears mounted thereon and meshed with the racks affixed to the closure panels. Rotation of a pinion gear mounted at one end of one of the drive shafts, of course, imparts rotary motion to the pinion gear mounted thereon at the opposite end thereof. Since the pinion gears are meshed with the racks affixed to the opposite ends of the closure panel, each of the gears alternatively functions as a driver and as a driven gear, depending upon the closure panel first experiencing motion. It should, therefore, be apparent that the motion imparted to the closure panels 22 and 24 is simultaneous and coextensive.

Once the closure panels have been displaced through a distance suitable for separating the panels to provide an opening of a predetermined cross-sectional dimension, the selector valve 54 is repositioned for locking the system, whereby the cross-sectional area of the discharge opening remains constant.

In order to return the closure panels 22 and 24 into an abutting relationship, for thus covering the discharge opening 18, the selector valve 54 is repositioned to assume configuration for pressurizing the opposite ends of the rams 32 through 38. As such pressurization occurs, motion in a reverse direction is imparted to the output shafts 40 of the rams, so that the closure panels 22 and 24 are displaced in a reverse direction simultaneously and coextensively as the bell crank 62 of the motion balancing mechanism 60 and the drive shafts 76 and 78 of the lag-elimination gear train operate in a manner reversed from that previously described.

Thus, the panels 22 and 24 are displaced in simultaneous rectilinear displacement, although in opposite directions, for selectively covering and uncovering the discharge opening 18 for thus precisely controlling the flow of contents from the hoppers.

It should readily be apparent that through the improved metering gate of the instant invention, it is possible to achieve increased control over the operation of the closure panels of a metering gate and thus achieve an improved efficiency in the operation of the hopper to which the metering gate is attached.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In combination with a hopper adapted to confine a fluid material including a vertically oriented discharge opening located in the bottom thereof, an improved metering gate for metering a fluid material as it is discharged from said hopper comprising:
    A. means including a pair of closure panels arranged in coplanar relation for selectively closing said discharge opening;
    B. means for supporting said pair of panels for rectilinear displacement in opposite directions along a pair of aligned linear paths including a pair of linear tracks extended in mutual parallelism along opposite sides of said discharge opening for receiving in supported relationship the opposite end portions of said closure panels;
    C. drive means for simultaneously displacing said closure panels in opposite directions along said pair of paths including a first ram connected to one closure panel of said pair, and a second ram connected to the other closure panel of said pair;

D. motion balancing means interconnecting said closure panels for equalizing the distances through which said panels are displaced along said paths by said first and second rams;

E. a bell crank supported for oscillating displacement and a pair of connecting rods interconnecting the opposite arms of said bell crank with said pair of closure panels; and F. lag-elimination means interconnecting the opposite ends of each closure panel of said pair for equalizing the displacement imparted thereto by said drive means, comprising a rotatable drive shaft extended between the opposite ends of each of the panels, a pair of racks mounted on each panel of the pair of closure panels, near the opposite ends thereof, and extended in parallelism with the path of the panel, and a pinion gear meshed with each rack of said pair of racks and rigidly affixed to the drive shaft extended between the opposite ends of the closure panel on which the rack is mounted.

2. In combination with a hopper adapted to confine a fluid material including a vertically oriented discharge opening located in the bottom thereof, an improved metering gate for metering a fluid material as it is discharged from said hopper comprising;

A. means including a pair of closure panels arranged in coplanar relation for selectively closing said discharge opening;

B. means for supporting said pair of panels for rectilinear displacement in opposite directions along a pair of aligned linear paths including a pair of linear tracks extended in mutual parallelism along opposite sides of said discharge opening for receiving in supported relationship the opposite end portions of said closure panels;

C. drive means for simultaneously displacing said closure panels in opposite directions along said pair of paths including a pair of rams connected with each panel of said pair, each ram being characterized by an axially extensible shaft supported for rectilinear displacement and connected with a closure panel near one end thereof;

D. motion balancing means interconnecting said closure panels for equalizing the distances through which said panels are displaced along said paths by said pairs of rams including a bell crank having the end portion of each arm thereof connected to one closure panel of said pair of closure panels; and E. lag-elimination means for equalizing the displacement imparted to the opposite ends of each closure panel of said pair of panels, including a pair of mutually spaced racks mounted on each panel in parallelism with one path of said pair of linear paths, a rotatable drive shaft extended between the opposite ends of each panel and supported for rotation about an axis coincident with the longitudinal axis of symmetry thereof, and a pair of mutually spaced pinion gears mounted on each drive shaft and meshed with one pair of said racks, whereby each end portion of said pair of closure panels is displaced through a distance equal to the distance through which any other end portion of said pair of closure panels is displaced by the rams of said drive means.

3. The metering gate of claim 2 wherein said hopper is mounted on a vehicle.

4. The metering gate of claim 3 wherein said vehicle comprises a trailer particularly adapted for hauling bulk cargo such as grain and the like.

* * * * *